(12) United States Patent
Kijima et al.

(10) Patent No.: US 11,583,932 B2
(45) Date of Patent: Feb. 21, 2023

(54) ROTATIONAL FORCE TRANSMISSION MECHANISM, TURRET TOOL REST, AND LATHE

(71) Applicant: Yamazaki Mazak Corporation, Niwa-gun (JP)

(72) Inventors: Tetsuya Kijima, Niwa-gun (JP); Yasuhiro Fujii, Niwa-gun (JP); Yukimasa Tashiro, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 153 days.

(21) Appl. No.: 17/158,007

(22) Filed: Jan. 26, 2021

(65) Prior Publication Data

US 2021/0138555 A1    May 13, 2021

Related U.S. Application Data

(63) Continuation of application No. PCT/JP2018/039876, filed on Oct. 26, 2018.

(51) Int. Cl.
    *B23B 7/04* (2006.01)
(52) U.S. Cl.
    CPC ..................... *B23B 7/04* (2013.01)
(58) Field of Classification Search
    CPC .. B23B 7/04; B23B 29/24; B23Q 3/12; B23Q 2200/002
    See application file for complete search history.

(56) References Cited

U.S. PATENT DOCUMENTS 5,455,993 A * 10/1995 Link ................. B23Q 39/02
                                                408/35
5,771,762 A *  6/1998 Bissett ............. B23B 33/005
                                                82/170

(Continued)

FOREIGN PATENT DOCUMENTS

CN        1370648        9/2002
CN      101850427       10/2010
               (Continued)

OTHER PUBLICATIONS

Chinese Office Action for corresponding CN Application No. 201880090378.1, dated Jul. 21, 2021 (W/ English machine translation).

(Continued)

*Primary Examiner* — Alan Snyder
(74) *Attorney, Agent, or Firm* — Mori & Ward, LLP

(57) ABSTRACT

A rotational force transmission mechanism includes a shaft and an engagement member. The shaft is rotatable about a first axis. The shaft includes a leading end portion having a second groove and a first groove which is configured to receive a rotatable portion of a tool holder so that the shaft rotates the rotatable portion about the first axis. The engagement member is movable along the first axis between a first position and a second position and rotatable about the first axis together with the shaft. The engagement member includes an engagement portion configured to be received in the second groove. At least one of the shaft and the engagement member has an inclined surface that moves the engagement portion in a direction toward the first axis when the engagement member moves from the first position to the second position.

20 Claims, 11 Drawing Sheets

(56) References Cited

U.S. PATENT DOCUMENTS

| 6,925,694 | B2 | 8/2005 | Sauter et al. |
|---|---|---|---|
| 2002/0113381 | A1 | 8/2002 | Casel et al. |
| 2010/0242694 | A1 | 9/2010 | Kitayama et al. |
| 2014/0251097 | A1 | 9/2014 | Walz et al. |

FOREIGN PATENT DOCUMENTS

| DE | 3604927 | | 8/1987 |
|---|---|---|---|
| DE | 202013100758 | U1 | 5/2014 |
| EP | 3278910 | | 2/2018 |
| JP | 05-228708 | | 9/1993 |
| JP | 10-244407 | | 9/1998 |
| JP | 2006-7401 | | 1/2006 |
| JP | 2007-210042 | | 8/2007 |
| JP | 4948844 | B2 | 8/2007 |
| JP | 2009-297795 | | 12/2009 |
| JP | 2014-515995 | | 7/2014 |
| WO | WO 2015/008124 | | 1/2015 |

OTHER PUBLICATIONS

Supplementary European Search Report for corresponding EP Application No. 18937633.8-1016, dated Aug. 19, 2021.
European Office Action for corresponding EP Application No. 18937633.8-1016, dated Sep. 1, 2021.
English translation of the Written Opinion for corresponding International Application No. PCT/JP2018/039876, dated Apr. 8, 2021.
International Search Report for corresponding International Application No. PCT/JP2018/039876, dated Jan. 22, 2019.
Written Opinion for corresponding International Application No. PCT/JP2018/039876, dated Jan. 22, 2019.
Japanese Office Action for corresponding JP Application No. 2019-517859, dated May 29, 2019 (w/English machine translation).
European Office Action for corresponding EP Application No. 18937633.8-1016, dated Jan. 19, 2022.
Chinese Office Action for corresponding CN Application No. 201880090378.1, dated Feb. 8, 2021 (w/ English machine translation).

* cited by examiner

ROTATIONAL FORCE TRANSMISSION MECHANISM, TURRET TOOL REST, AND LATHE

CROSS-REFERENCE TO RELATED APPLICATIONS

The present application is a continuation application of International Application No. PCT/JP2018/039876, filed Oct. 26, 2018. The contents of this application are incorporated herein by reference in their entirety.

BACKGROUND OF THE INVENTION

Field of the Invention

The present invention relates to a rotational force transmission mechanism, a turret tool rest, and a lathe.

Discussion of the Background

There is a mechanism known to transmit rotational force of a shaft to a rotatable tool.

As a related technique, JP5-228708A discloses a turret tool axis driver. In the tool axis driver recited in JP5-228708A, a rotation of a drive shaft is transmitted to a rotatable tool by engagement between a groove on the drive shaft and a protrusion of the rotatable tool.

JP2007-210042A discloses a rotatable tool turret. In the rotatable tool turret recited in JP2007-210042A, a rotation of a connection shaft is transmitted to a rotatable tool by engagement between an engagement groove of a connection shaft and a tang of the rotatable tool. The engagement groove is defined by inclined side walls, and the tang has inclined side surfaces. In the rotatable tool turret recited in JP2007-210042A, by causing the connection shaft to proceed, the engagement groove of the connection shaft and the tang of the rotatable tool are closely connected to each other; and by causing the connection shaft to withdraw, the connection between the engagement groove of the connection shaft and the tang of the rotatable tool is loosened.

SUMMARY OF THE INVENTION

According to one aspect of the present invention, a rotational force transmission mechanism includes a shaft and an engagement member. The shaft is rotatable about a first axis. The shaft includes a leading end portion having a second groove and a first groove which is configured to receive a rotatable portion of a tool holder so that the shaft rotates the rotatable portion about the first axis. The engagement member is movable along the first axis between a first position and a second position and rotatable about the first axis together with the shaft. The engagement member includes an engagement portion configured to be received in the second groove. At least one of the shaft and the engagement member has an inclined surface that moves the engagement portion in a direction toward the first axis when the engagement member moves from the first position to the second position.

According to another aspect of the present invention, a turret tool rest includes a turret, a shaft, and an engagement member. The turret is swingable about a second axis. A plurality of tool holders are mountable on the turret. The shaft is contained in the turret rotatably about a first axis. The shaft includes a leading end portion having a second groove and a first groove which is configured to receive a rotatable portion of a tool holder that is among the plurality of tool holders and that is disposed on the first axis so that the shaft rotates the rotatable portion about the first axis. The engagement member is movable along the first axis between a first position and a second position and rotatable about the first axis together with the shaft. The engagement member includes an engagement portion configured to be received in the second groove. At least one of the shaft and the engagement member has an inclined surface that moves the engagement portion in a direction toward the first axis when the engagement member moves from the first position to the second position.

According to the other aspect of the present invention, a lathe includes a base, a spindle, a turret tool rest, and a carriage. The spindle is configured to support a workpiece. The turret tool rest includes a turret base, a turret, a turret driver, a shaft, a shaft driver, an engagement member, and an engagement member driver. The turret is swingable about a second axis. A plurality of tool holders are mountable on the turret. The turret driver is configured to swing the turret about the second axis. The shaft is contained in the turret rotatably about a first axis. The shaft includes a leading end portion having a second groove and a first groove which is configured to receive a rotatable portion of a tool holder that is among the plurality of tool holders and that is disposed on the first axis so that the shaft rotates the rotatable portion about the first axis. The shaft driver is configured to rotate the shaft about the first axis. The engagement member is movable along the first axis between a first position and a second position and rotatable about the first axis together with the shaft. The engagement member includes an engagement portion configured to be received in the second groove. At least one of the shaft and the engagement member has an inclined surface that moves the engagement portion in a direction toward the first axis when the engagement member moves from the first position to the second position. The engagement member driver is configured to move the engagement member along the first axis. The carriage is configured to move the turret tool rest relative to the base.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
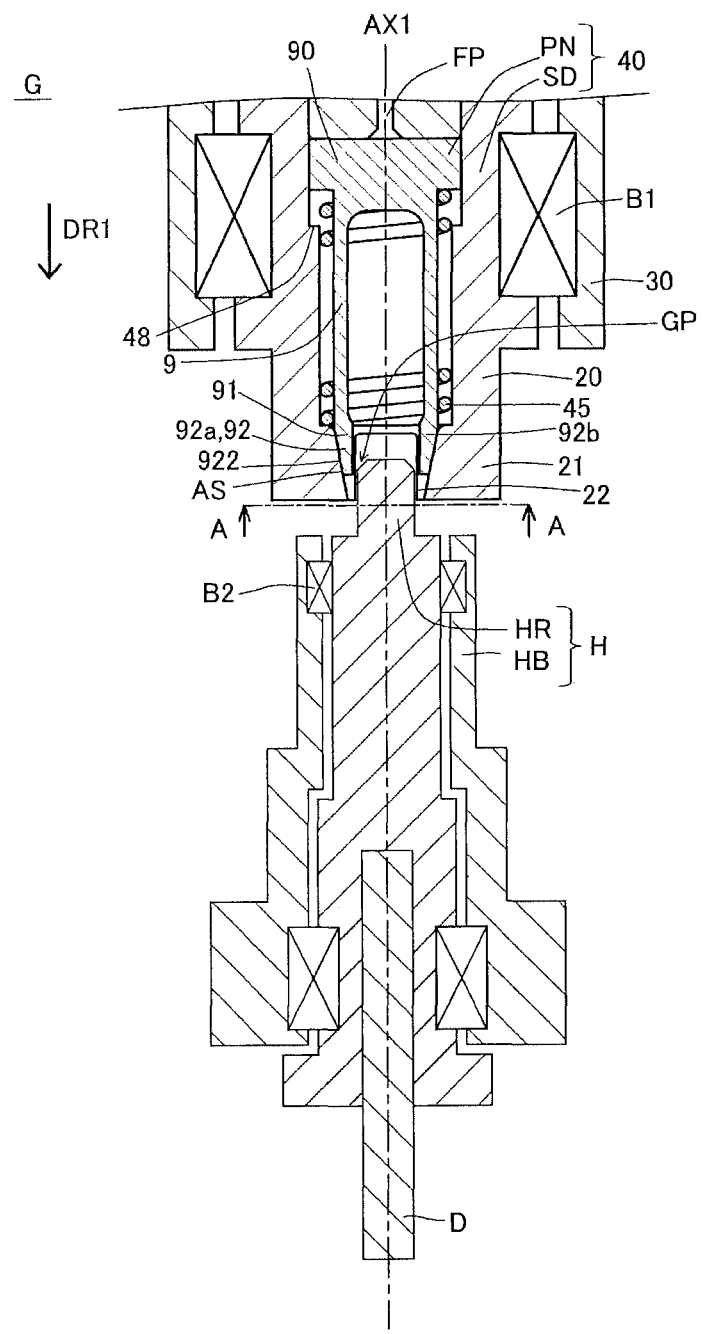
FIG. 1 is a schematic longitudinal sectional view of an example rotational force transmission mechanism according to a first embodiment.

By referring to the accompanying drawings, a rotational force transmission mechanism G, a turret tool rest 2, and a lathe 1 according to some embodiments of the present invention will be described. It is noted that in the following description of the embodiments, identical reference numerals are used to denote identical portions, members, or components having identical functions, and redundant description of identical portions, members, or components will be omitted.

Definition of Direction

In this specification, the direction from a base end portion toward a leading end portion 21 of a shaft 20 is defined as first direction DR1.

First Embodiment

Figure 2:
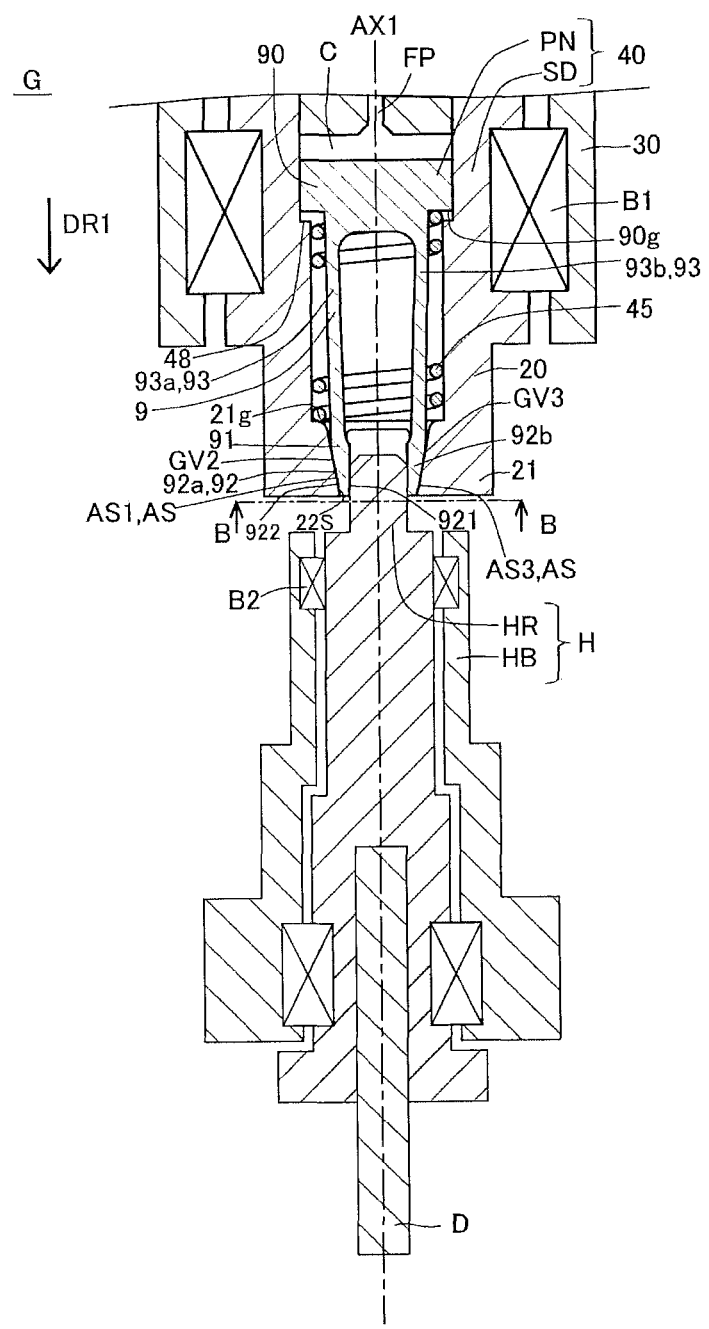
FIG. 2 is a schematic longitudinal sectional view of the example rotational force transmission mechanism according to the first embodiment.
Figure 3:
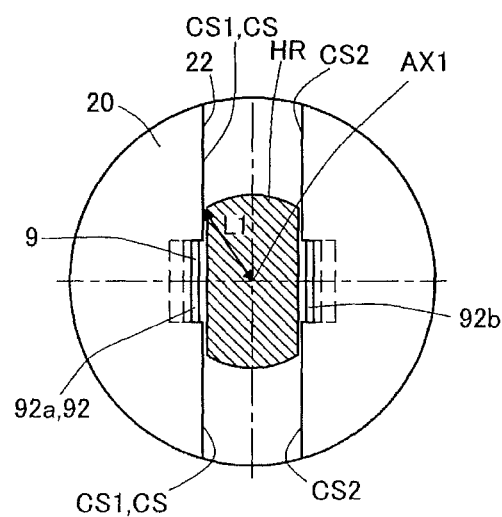
FIG. 3 is a sectional view of the rotational force transmission mechanism taken along the line A-A illustrated in FIG. 1.
Figure 4:
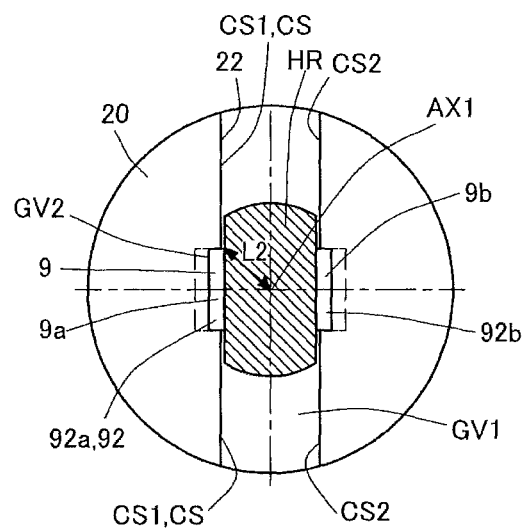
FIG. 4 is a sectional view of the rotational force transmission mechanism taken along the line B-B illustrated in FIG. 2.
Figure 5:
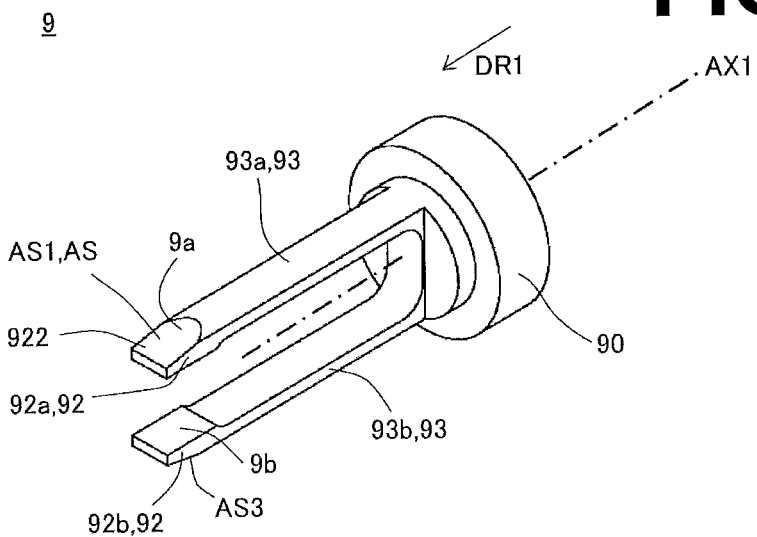
FIG. 5 is a schematic perspective view of an example engagement member.
Figure 6:
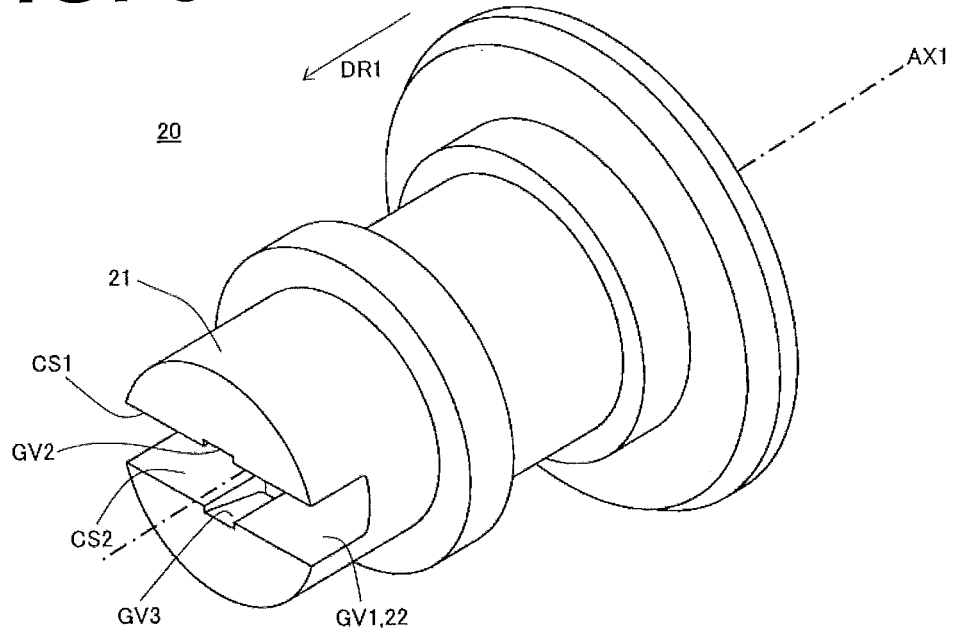
FIG. 6 is a schematic perspective view of an example shaft.
Figure 7A:
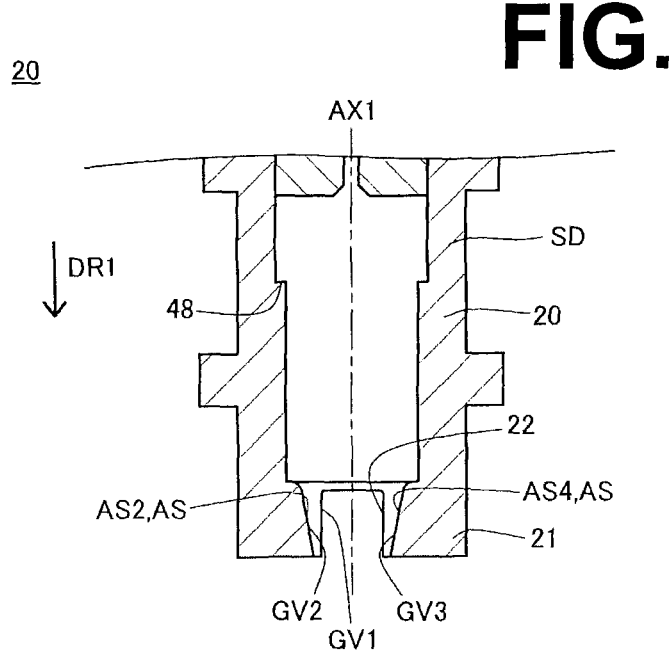
FIG. 7A is a schematic longitudinal sectional view of the example shaft.
Figure 7B:
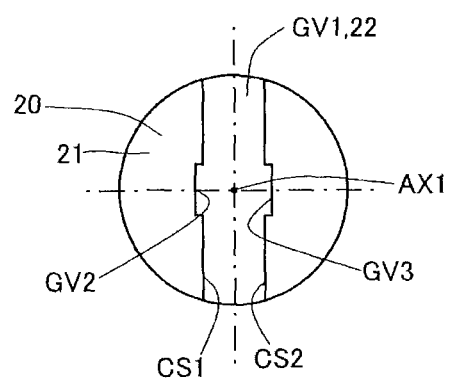
FIG. 7B is a schematic bottom view of the example shaft.
Figure 8A:
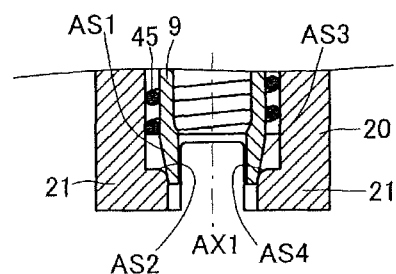
FIG. 8A is a schematic longitudinal sectional view of a modified inclined surface.
Figure 8B:
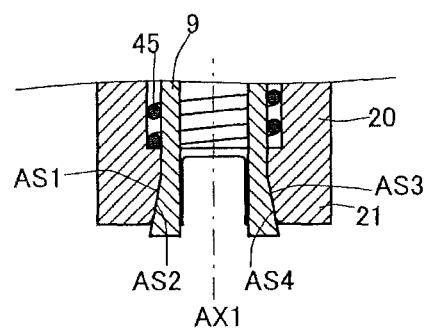
FIG. 8B is a schematic longitudinal sectional view of a modified inclined surface.

By referring to FIGS. 1 to 8, the rotational force transmission mechanism G according to the first embodiment will be described. FIGS. 1 and 2 are schematic longitudinal sectional views of an example of the rotational force transmission mechanism G according to the first embodiment. It is to be noted that FIG. 1 illustrates a state in which an engagement member (an example of "an engagement pin") 9 is located at a first position, and FIG. 2 illustrates a state in which the engagement member 9 is located at the second position. FIG. 3 is a sectional view of the rotational force transmission mechanism G taken along the line A-A illustrated in FIG. 1. FIG. 4 is a sectional view of the rotational force transmission mechanism G taken along the line B-B illustrated in FIG. 2. FIG. 5 is a schematic perspective view of an example of the engagement member 9. FIG. 6 is a schematic perspective view of an example of the shaft 20. FIG. 7A is a schematic longitudinal sectional view of the example shaft 20. FIG. 7B is a schematic bottom view of the example shaft 20. FIGS. 8A and 8B are schematic longitudinal sectional views of modified inclined surfaces AS.

The rotational force transmission mechanism G includes: the shaft 20, which drives a rotatable portion HR of a tool holder H; and the engagement member 9.

The shaft 20 is a member that is rotatable about first axis AX1. The shaft 20 is caused to rotate about the first axis AX1 by driving force transmitted from a driver such as a motor.

In the example illustrated in FIG. 1, the shaft 20 is supported by a housing 30 rotatably about the first axis AX1. A bearing member B1 is interposed between the shaft 20 and the housing 30. In FIG. 1, the extending direction in which the first axis AX1 extends is parallel to the first direction DR1.

The shaft 20 includes a receiving portion 22. The receiving portion 22 receives at least a part of the rotatable portion HR of the tool holder H (more specifically, a base end portion of the rotatable portion HR). In the example illustrated in FIG. 1, the receiving portion 22 is disposed at the leading end portion 21 of the shaft 20.

The engagement member 9 is a member that is movable along the first axis AX1 between the first position (see FIG. 1) and the second position (see FIG. 2). The engagement member 9 is rotatable about the first axis AX1 by rotation of the shaft 20. In the example illustrated in FIG. 1, the engagement member 9 has a longitudinal center axis that is substantially parallel to the first direction DR1.

The engagement member 9 includes an engagement portion 92. The engagement portion 92 is engageable with the rotatable portion HR of the tool holder H. In the example illustrated in FIG. 1, the engagement portion 92 is disposed at a leading end portion 91 of the engagement member 9.

In the first embodiment, at least one of the shaft 20 and the engagement member 9 includes the inclined surface AS. When the engagement member 9 moves from the first position (see FIG. 1) to the second position (see FIG. 2), the inclined surface AS moves the engagement portion 92 of the engagement member 9 in a direction toward the first axis AX1. In the example illustrated in FIG. 1, when the engagement member 9 moves from the first position to the second position, the engagement portion 92 moves toward the first axis AX1 while moving along the first axis AX1.

In the first embodiment, at least one of the shaft 20 and the engagement member 9 includes the inclined surface AS. Due to the presence of the inclined surface AS, the gap, GP, between the rotatable portion HR of the tool holder H and the engagement portion 92 becomes smaller as the engagement member 9 moves from the first position (see FIG. 1) toward the second position (see FIG. 2). When the engagement portion 92 transmits rotational force to the rotatable portion HR by contacting the rotatable portion HR, the gap GP becomes smaller. This reduces a delay in transmission caused by the gap GP and/or an impact caused by the contact. As a result, the rotational force of the shaft 20 is transmitted to the rotatable portion HR via the engagement portion 92 at a higher level of accuracy.

In the examples illustrated in FIGS. 1 and 2, when the engagement member 9 is located at the first position (see FIG. 1), the rotational force of the shaft 20 is transmitted to the rotatable portion HR at a fair level of accuracy. When the engagement member 9 is located at the second position (see FIG. 2), the rotational force of the shaft 20 is transmitted to the rotatable portion HR at a level of accuracy higher than the fair level of accuracy. In the examples illustrated in FIGS. 1 and 2, the rotational force transmission mechanism G includes the engagement member 9. The engagement member 9 is changeable in position between the first position and the second position. This enables the rotational force transmission mechanism G to make the rotational force transmission accuracy switchable at least between two levels, namely, the fair level of accuracy and the higher level of accuracy. In the examples illustrated in FIGS. 1 and 2, the mechanism to switch the rotational force transmission accuracy is simple. Also in the examples illustrated in FIGS. 1 and 2, it is not necessary to replace the tool holder H in order to switch the rotational force transmission accuracy.

In the examples illustrated in FIGS. 1 and 2, when the engagement member 9 moves from the first position (see FIG. 1) to the second position (see FIG. 2), the positional relationship between the receiving portion 22 of the shaft 20 and the rotatable portion HR remains substantially unchanged. In other words, in the examples illustrated in FIGS. 1 and 2, the length of the portion of the rotatable portion HR existing in the receiving portion 22 (the length in the direction along the first axis AX1) remains substantially unchanged, irrespective of the position of the engagement member 9. This eliminates or minimizes a deficiency in rigidity of the connection between the receiving portion 22 and the rotatable portion HR.

As used in the first embodiment, the term "tool holder H" is intended to mean a member that supports a rotatable tool D. Also as used in the first embodiment, the term "rotatable portion HR" of the tool holder H is intended to mean a portion that is rotatable relative to a fixed portion HB of the tool holder H. The rotatable portion HR of the tool holder H may be a portion to be connected to the rotatable tool D, or may be the rotatable tool D itself. In the example illustrated in FIG. 1, the fixed portion HB rotatably supports the rotatable portion HR via a bearing member B2.

By referring to FIGS. 1 to 4, an example optional configuration employable in the first embodiment will be described.

Contact Surface CS

In the examples illustrated in FIGS. 3 and 4, the receiving portion 22 has a contact surface CS. The contact surface CS contacts the rotatable portion HR.

As illustrated in FIG. 3, when the engagement member 9 is located at the first position, the engagement portion 92 of the engagement member 9 is located at a position at which the engagement portion 92 is away from the contact surface CS in a direction away from the first axis AX1. In this case, when the shaft 20 rotates, the contact surface CS disposed on the shaft 20 comes into direct contact with the rotatable portion HR so that the rotatable portion HR is directly driven into rotation by the shaft 20.

As illustrated in FIG. 4, when the engagement member 9 is located at the second position, the engagement portion 92 of the engagement member 9 is located at a position at which the engagement portion 92 protrudes from the contact surface CS in the direction toward the first axis AX1. In this case, when the shaft 20 rotates, the engagement portion 92 of the engagement member 9 comes into direct contact with the rotatable portion HR so that the rotatable portion HR is driven into rotation by the shaft 20 indirectly via the engagement member 9. In the example illustrated in FIG. 4, there is no or minimal gap between the engagement portion 92 and the rotatable portion HR. This enables the shaft 20 and the engagement portion 92 to transmit rotational force to the rotatable portion HR at a relatively higher level of accuracy (in other words, the rotatable tool D supported by the tool holder H can be used in machining that requires high levels of machining accuracy). Further, the rotatable tool D is usable in such machining that the rotatable tool D receives loads from different directions from the workpiece while the rotatable tool D is working on the workpiece (an example of such machining is gear skiving, described later). Even in such machining, least or no vibration of the rotatable tool D is caused to occur by the gap between the engagement portion 92 and the rotatable portion HR. As a result, the machining is performed at a higher level of accuracy.

Thus, in the examples illustrated in FIGS. 3 and 4, the rotational force transmission mechanism G is selectively usable in machining that requires a fair level of machining accuracy and machining that requires a high level of machining accuracy.

It is to be noted that in the examples illustrated in FIGS. 3 and 4, the contact surface CS of the receiving portion 22 (the contact surface CS contacting the rotatable portion HR) includes a first contact surface CS1 and a second contact surface CS2. The second contact surface CS2 faces the first contact surface CS1. In the examples illustrated in FIGS. 3 and 4, the first contact surface CS1 is parallel to the second contact surface CS2.

Also in the examples illustrated in FIGS. 3 and 4, the engagement portion 92 includes a first engagement portion 92a and a second engagement portion 92b. The second engagement portion 92b faces the first engagement portion 92a.

In the example illustrated in FIG. 3, when the engagement member 9 is located at the first position, the distance between the first contact surface CS1 and the second contact surface CS2 is smaller than the distance between the first engagement portion 92a and the second engagement portion 92b. Also, the first engagement portion 92a is withdrawn from the first contact surface CS1 in a direction away from the first axis AX1, and the second engagement portion 92b is withdrawn from the second contact surface CS2 in a direction away from the first axis AX1.

In the example illustrated in FIG. 4, when the engagement member 9 is located at the second position, the distance between the first contact surface CS1 and the second contact surface CS2 is larger than the distance between the first engagement portion 92a and the second engagement portion 92b. Also, the first engagement portion 92a protrudes from the first contact surface CS1 in a direction toward the first axis AX1, and the second engagement portion 92b protrudes from the second contact surface CS2 in a direction toward the first axis AX1.

Distance L1 between First Axis AX1 and Point at which Contact Surface CS Applies Rotational Force to Rotatable Portion HR, and Distance L2 between First Axis AX1 and Point at which Engagement Portion 92 Applies Rotational Force to Rotatable Portion HR The distance between the first axis AX1 and a point at which the contact surface CS applies rotational force to the rotatable portion HR when the engagement member 9 is located at the first position (see FIG. 3) is defined as distance L1. Also, the distance between the first axis AX1 and a point at which the engagement portion 92 applies rotational force to the rotatable portion HR when the engagement member 9 is located at the second position (see FIG. 4) is defined as distance L2. As used herein, the phrase "point at which the contact surface CS applies rotational force to the rotatable portion HR when the engagement member 9 is located at the first position" is intended to mean a point that is farthest from the first axis AX1 among points in the contact area (linear contact area or planar contact area) over which the contact surface CS and the rotatable portion HR contact each other when the contact surface CS rotates about the first axis AX1. Also as used herein, the phrase "point at which the engagement portion 92 applies rotational force to the rotatable portion HR when the engagement member 9 is located at the second position" is intended to mean a point that is farthest from the first axis AX1 among points in the contact area (linear contact area or planar contact area) over which the engagement member 9 and the rotatable portion HR contact each other when the engagement member 9 rotates about the first axis AX1.

In the examples illustrated in FIGS. 3 and 4, the distance L1 is larger than the distance L2. In this case, the torque transmitted to the rotatable portion HR when the shaft 20 rotates at a predetermined rotational speed is larger in the state illustrated in FIG. 3 than in the state illustrated in FIG. 4. This makes the rotational force transmission mechanism G usable in high-load machining when the engagement member 9 is located at the first position (see FIG. 3). It is to be noted that when the shape of the rotatable portion HR of the tool holder H to be used varies, the position of the point at which the contact surface CS applies rotational force to the rotatable portion HR varies accordingly. Therefore, the distance L1 depends on the shape of the rotatable portion HR. However, in the examples illustrated in FIGS. 3 and 4, the distance L1 is kept larger than the distance L2, irrespective of the shape of the rotatable portion HR.

Gap between Engagement Portion 92 and Rotatable Portion HR when Engagement Member 9 is Located at Second Position In the example illustrated in FIG. 2, the shaft 20 contains the engagement member 9 movably along the first axis AX1. As illustrated in FIG. 2, when the engagement member 9 is located at the second position, the gap between the engagement portion 92 and the rotatable portion HR is preferably zero. More specifically, when the engagement member 9 is located at the second position, the outer surface, 922, of the engagement portion 92 is preferably in contact with the inner surface, 22s, of the shaft 20; and the inner surface, 921, of the engagement portion 92 is preferably in contact with the rotatable portion HR. This minimizes wobbling between the shaft 20 and the rotatable portion HR. As a result, the rotational force of the shaft 20 is transmitted to the rotatable portion HR via the engagement portion 92 at a higher level of accuracy.

Engagement Member Driver (an example of "an engagement pin actuator") 40

The rotational force transmission mechanism G may include an engagement member driver 40. The engagement member driver 40 moves the engagement member 9 along the first axis AX1. Examples of the engagement member driver 40 include a pneumatic actuator, a hydraulic actuator, an electric actuator, an electromagnetic actuator, and a mechanical actuator.

In the example illustrated in FIG. 1, the engagement member driver 40 includes a piston PN and a cylinder SD. The cylinder SD guides the piston PN. The piston PN may be made up of a part of the engagement member 9 (for example, a base end portion 90 of the engagement member 9), or may have a separate structure separate from the engagement member 9. When the piston PN has a separate structure separate from the engagement member 9, the piston PN is configured to press the engagement member 9. In the example illustrated in FIG. 2, the cylinder SD is made up of a part of the shaft 20. In other words, the shaft 20 includes a cylinder chamber C. The cylinder chamber C receives fluid (liquid or gas) to drive the piston PN.

In the example illustrated in FIG. 2, the engagement member driver 40 includes a fluid supply path FP. Through the fluid supply path FP, the engagement member driver 40 supplies fluid (liquid or gas) to the internal space (the cylinder chamber C) of the shaft 20. It is to be noted that considering a possible risk that the fluid leaks from the shaft 20, the fluid supplied to the internal space of the shaft 20 is preferably air. Accordingly, the fluid supply path FP is preferably an air supply path. It is to be noted, however, that when there is no risk of fluid leakage from the shaft 20, the fluid supplied to the internal space of the shaft 20 may be other fluid than air. Also, in order to keep the supplied fluid sealed, it is possible to provide a ring-shaped seal (not illustrated) between the cylinder SD and the piston PN.

Biasing Member (an example of "a spring") 45

The rotational force transmission mechanism G may include a biasing member 45. The biasing member 45 biases the engagement member 9 in a direction from the second position (see FIG. 2) toward the first position (see FIG. 1).

When the rotational force transmission mechanism G includes the biasing member 45, the engagement member 9 can be automatically returned to the first position.

In the example illustrated in FIG. 2, the biasing member 45 is a spring such as a coil spring. The biasing member 45 is disposed between the shaft 20 and the engagement member 9. In the example illustrated in FIG. 2, the biasing member 45 is disposed between the inner circumferential surface of the shaft 20 and the outer surface of the engagement member 9.

In the example illustrated in FIG. 2, the shaft 20 includes a shoulder 21g. The shoulder 21g is in contact with one end portion of the biasing member 45. The engagement member 9 includes a shoulder 90g. The shoulder 90g is in contact with another end portion of the biasing member 45. The shoulder 21g of the shaft 20 is formed at, for example, the leading end portion 21 of the shaft 20, and the shoulder 90g of the engagement member 9 is formed at, for example, the base end portion 90 of the engagement member 9.

Stopper 48

As illustrated in FIG. 2, the rotational force transmission mechanism G may include a stopper 48. The stopper 48 prevents the engagement member 9 from moving beyond a preset position in the first direction DR1. In other words, the stopper 48 defines a movement limitation position for the engagement member 9 moving in the first direction DR1. More specifically, when the stopper 48 and the base end portion 90 of the engagement member 9 contact each other, the movement of the engagement member 9 in the first direction DR1 is restricted. Assume in the example illustrated in FIG. 2 that the tool holder H does not exist. Under this assumption, when the engagement member 9 moves in the first direction DR1, the engagement member 9 cannot be stopped since there is no contact with the rotatable portion HR of the tool holder H. This may cause the engagement member 9 to deform to a degree exceeding its elasticity limit, with the result that the engagement member 9 is damaged or cannot return to its original shape. In contrast, when the rotational force transmission mechanism G includes the stopper 48, the stopper 48 prevents the engagement member 9 from moving excessively in the first direction DR1. Also, the stopper 48 eliminates or minimizes damage to the engagement member 9.

In the example illustrated in FIG. 2, the stopper 48 is a shoulder disposed at the inner circumferential surface of the shaft 20. In the example illustrated in FIG. 2, the stopper 48 is integral to the shaft 20. Alternatively, the stopper 48 may have a separate structure separate from the shaft 20. In this case, the stopper 48 is fixed to the shaft 20 by any convenient fixing means.

Engagement Member 9

As illustrated in FIG. 5, the engagement member 9 may include a plurality of holding pieces, including a first holding piece 9a and a second holding piece 9b. As illustrated in FIG. 4, when the engagement member 9 is located at the second position, the first holding piece 9a and the second holding piece 9b hold the rotatable portion HR.

In the example illustrated in FIG. 5, the first holding piece 9a serves as the engagement portion 92 (more specifically, the first engagement portion 92a), and the second holding piece 9b serves as the engagement portion 92 (more specifically, the second engagement portion 92b).

When the engagement member 9 includes the first holding piece 9a and the second holding piece 9b, the engagement between the rotatable portion HR and the engagement member 9 becomes more stable. When, in particular, the first holding piece 9a and the second holding piece 9b are symmetrical to each other relative to the first axis AX1 (see FIG. 2), the centering of the rotatable portion HR relative to the shaft 20 is performed more appropriately. In other words, the symmetry effectively eliminates or minimizes the locational deviation between the center axis of the shaft 20 and the center axis of the rotatable portion HR.

In the example illustrated in FIG. 5, the engagement member 9 includes a leg 93. The leg 93 supports the engagement portion 92. The leg 93 is a portion located between the base end portion 90 and the engagement portion 92. The leg 93 is elastically deformable in a direction toward the first axis AX1. The elastically deformable property of the leg 93 ensures that the engagement portion 92 moves toward the rotatable portion HR when the engagement member 9 moves in the first direction DR1. In other words, when the engagement member 9 moves in the first direction DR1, the gap between the engagement portion 92 and the outer surface of the rotatable portion HR automatically decreases.

Also when the leg 93 is elastically deformable, a high level of dimensional accuracy is not required of the engagement portion 92. In other words, the engagement portion 92 may somewhat vary in dimension due to manufacturing errors; even in this case, moving the engagement member 9 in the first direction DR1 makes the gap between the engagement portion 92 and the outer surface of the rotatable portion HR zero or minimal.

In the example illustrated in FIG. 5, the engagement member 9 includes: a first leg 93a, which supports the first engagement portion 92a; and a second leg 93b, which supports the second engagement portion 92b. The first leg 93a and the second leg 93b are symmetrical to each other relative to the first axis AX1.

An example of the material of the engagement member 9 is metal. The engagement member 9 may be an integrally formed single member or may be an assembly of a plurality of parts.

Shaft 20

In the example illustrated in FIG. 6, the leading end portion 21 of the shaft 20 includes: a first groove GV1, which receives at least a part of the rotatable portion HR; and a second groove GV2, which receives the engagement portion 92 (more specifically, the first engagement portion 92a).

The first groove GV1 serves as the receiving portion 22, which receives at least a part of the rotatable portion HR. The extending direction in which the first groove GV1 extends is a direction substantially perpendicular to the first direction DR1. The depth direction of the first groove GV1 is a direction substantially parallel to the first direction DR1. The first groove GV1 has: a first side surface, which includes the first contact surface CS1; and a second side surface, which includes the second contact surface CS2.

The second groove GV2 serves as a second receiving portion that receives the engagement portion 92 (more specifically, the first engagement portion 92a). In the example illustrated in FIG. 7A, the second groove GV2 extends along the first direction DR1. The depth direction of the second groove GV2 is a direction substantially perpendicular to the first direction DR1. In the example illustrated in FIG. 7A, the depth of the second groove GV2 becomes smaller in the first direction DR1 toward the leading end portion of the shaft 20.

In the example illustrated in FIG. 7B, the second groove GV2 is a depression disposed at the contact surface CS (more specifically, the first contact surface CS1). The second groove GV2 is formed by, for example, cutting a part of the first contact surface CS1.

In the example illustrated in FIG. 7A, the leading end portion 21 of the shaft 20 includes a third groove GV3. The third groove GV3 receives the second engagement portion 92b. The third groove GV3 extends along the first direction DR1. The depth direction of the third groove GV3 is a direction substantially perpendicular to the first direction DR1. In the example illustrated in FIG. 7A, the depth of the third groove GV3 becomes smaller in the first direction DR1 toward the leading end portion of the shaft 20.

In the example illustrated in FIG. 7B, the third groove GV3 is a depression disposed at the second contact surface CS2. The third groove GV3 is formed by, for example, cutting a part of the second contact surface CS2.

An example of the material of the shaft 20 is metal. The shaft 20 may be an integrally formed single member or may be an assembly of a plurality of parts.

Inclined Surface AS

As described above, at least one of the shaft 20 and the engagement member 9 includes at least one inclined surface AS, which moves the engagement portion 92 of the engagement member 9 in the direction toward the first axis AX1 when the engagement member 9 moves from the first position (see FIG. 1) to the second position (see FIG. 2).

In the example illustrated in FIG. 5, a plurality of inclined surfaces AS are provided. One of the inclined surfaces AS is a first inclined surface AS1, which is disposed at the engagement portion 92. The first inclined surface AS1 is disposed on the outer surface 922 of the engagement portion 92 (more specifically, the first engagement portion 92a). The first inclined surface AS1 inclines toward the first axis AX1 as the first inclined surface AS1 extends toward a leading end portion of the engagement member 9.

In the example illustrated in FIG. 5, another inclined surface of the AS plurality of inclined surfaces AS is a third inclined surface AS3. The third inclined surface AS3, which is disposed at the second engagement portion 92b. The third inclined surface AS3 is disposed on the outer surface of the second engagement portion 92b. The third inclined surface AS3 inclines toward the first axis AX1 as the third inclined surface AS3 extends toward the leading end portion of the engagement member 9.

In the example illustrated in FIG. 7A, a plurality of inclined surfaces AS are provided. One of the inclined surfaces AS is a second inclined surface AS2, which is disposed at the leading end portion 21 of the shaft 20 (more specifically, the inner surface of the leading end portion 21). The second inclined surface AS2 is disposed on the bottom of the second groove GV2. The second inclined surface AS2 inclines toward the first axis AX1 as the second inclined surface AS2 extends toward the leading end portion of the shaft 20.

In the example illustrated in FIG. 7A, another inclined surface AS of the plurality of inclined surfaces AS is a fourth inclined surface AS4, which is disposed at the leading end portion 21 of the shaft 20 (more specifically, the inner surface of the leading end portion 21). The fourth inclined surface AS4 is disposed on the bottom of the third groove GV3. The fourth inclined surface AS4 inclines toward the first axis AX1 as the fourth inclined surface AS4 extends toward the leading end portion of the shaft 20.

In the examples illustrated in FIGS. 1 and 2, when the engagement member 9 moves in the first direction DR1, the outer surface 922 of the first engagement portion 92a is guided by the bottom of the second groove GV2. Also when the engagement member 9 moves in the first direction DR1, the outer surface of the second engagement portion 92b is guided by the bottom of the third groove GV3.

In the examples illustrated in FIGS. 5 to 7B, the outer surface 922 of the first engagement portion 92a is the inclined surface (AS1), the outer surface of the second engagement portion 92b is the inclined surface (AS3), the bottom of the second groove GV2 is the inclined surface (AS2), and the bottom of the third groove GV3 is the inclined surface (AS4).

It is to be noted that the inclined surface AS may be a planar inclined surface or a curved inclined surface. For example, in the example illustrated in FIG. 7A, the inclined surfaces disposed on the inner surface of the leading end portion 21 of the shaft 20 (more specifically, the second inclined surface AS2 and the fourth inclined surface AS4) are curved inclined surfaces.

In the example illustrated in FIG. 5, the first inclined surface AS1 inclines toward the first axis AX1 as the first inclined surface AS1 extends toward the leading end portion of the engagement member 9. Also, in the example illustrated in FIG. 7A, the second inclined surface AS2 inclines toward the first axis AX1 as the second inclined surface AS2 extends toward the leading end portion of the shaft 20. Alternatively, as illustrated in FIG. 8B, the first inclined surface AS1 (or the third inclined surface AS3) may incline in a direction away from the first axis AX1 as the first inclined surface AS1 (or the third inclined surface AS3) extends toward the leading end portion of the engagement member 9. Also, the second inclined surface AS2 (or the fourth inclined surface AS4) may incline in a direction away from the first axis AX1 as the second inclined surface AS2 (or the fourth inclined surface AS4) extends toward the leading end portion of the shaft 20.

Second Embodiment

Figure 9:
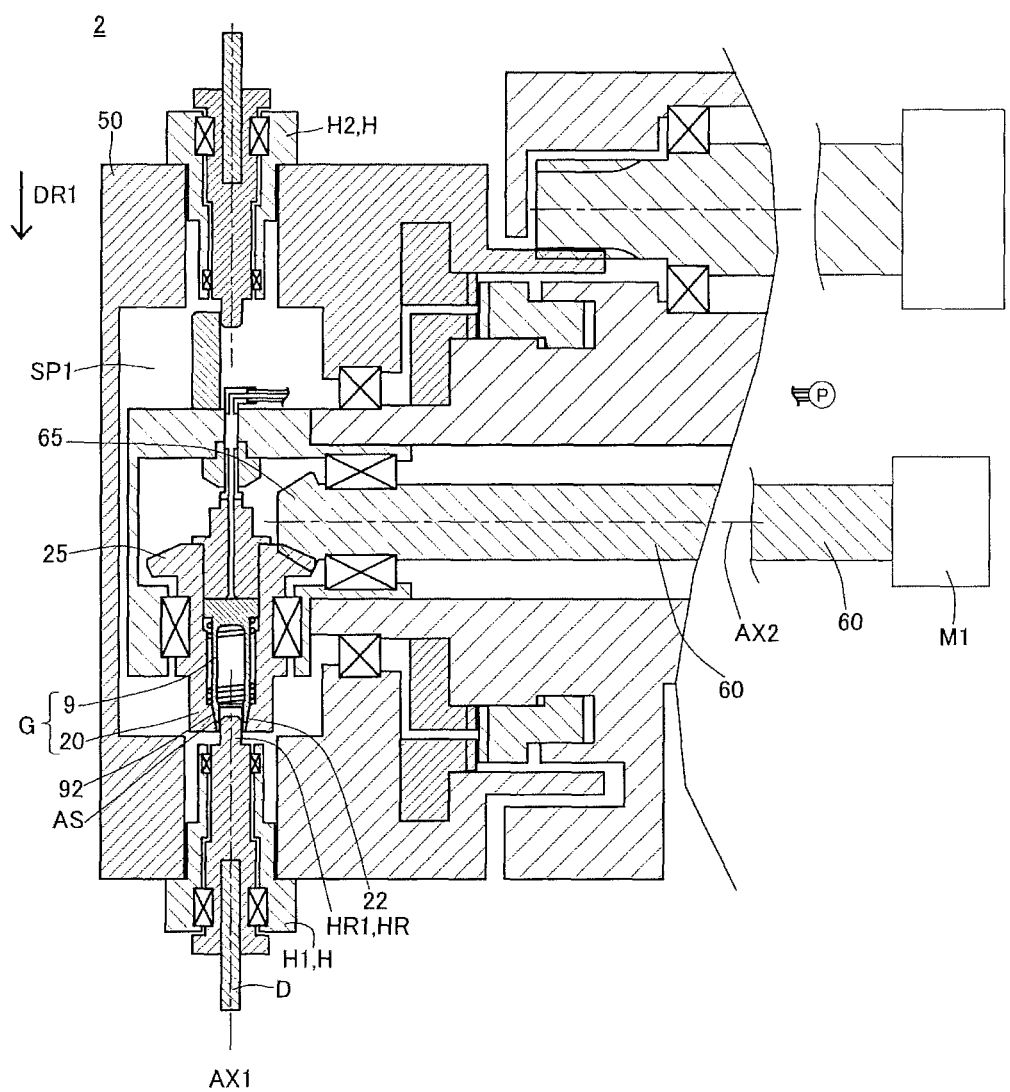
FIG. 9 is a schematic longitudinal sectional view of an example turret tool rest according to a second embodiment.
Figure 10:
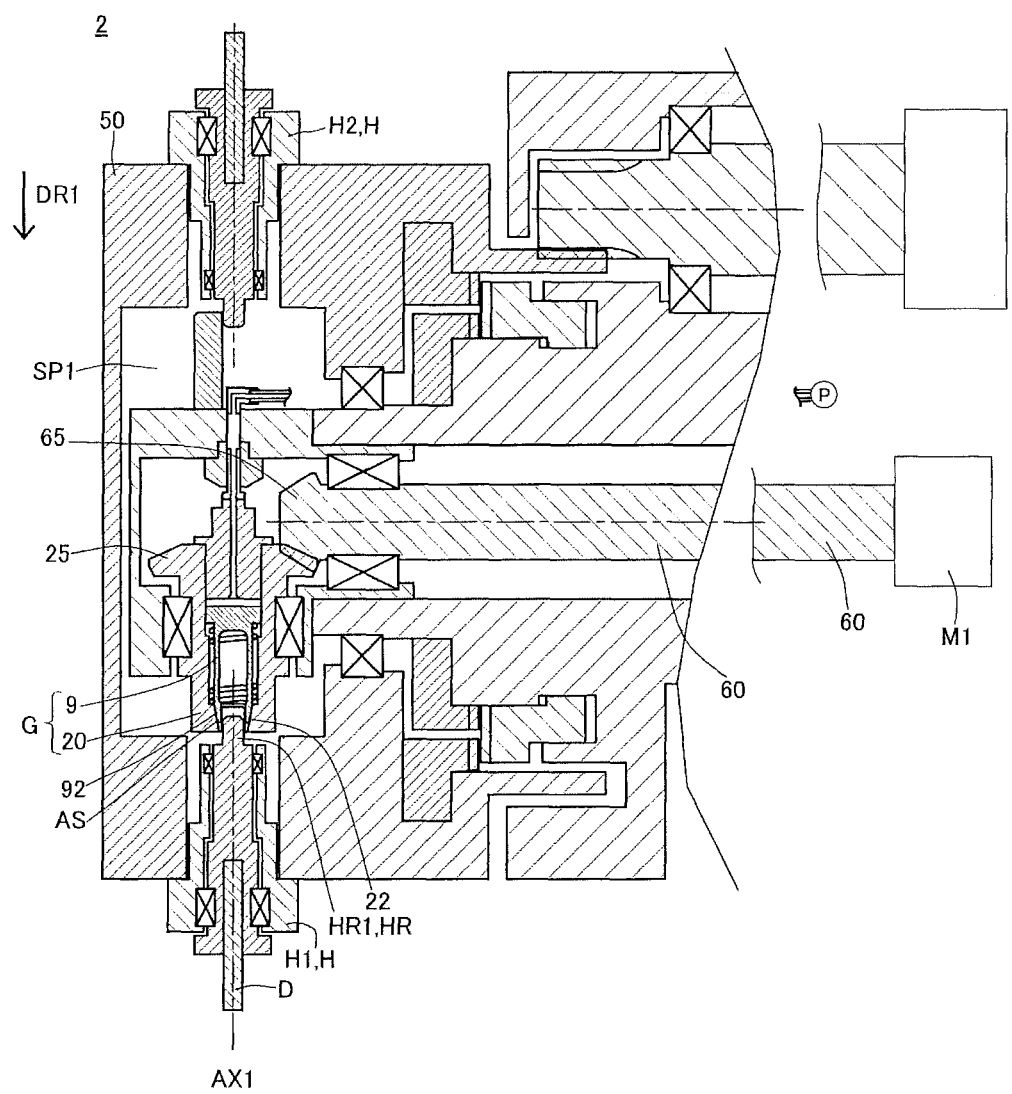
FIG. 10 is a schematic longitudinal sectional view of the example turret tool rest according to the second embodiment.
Figure 11:
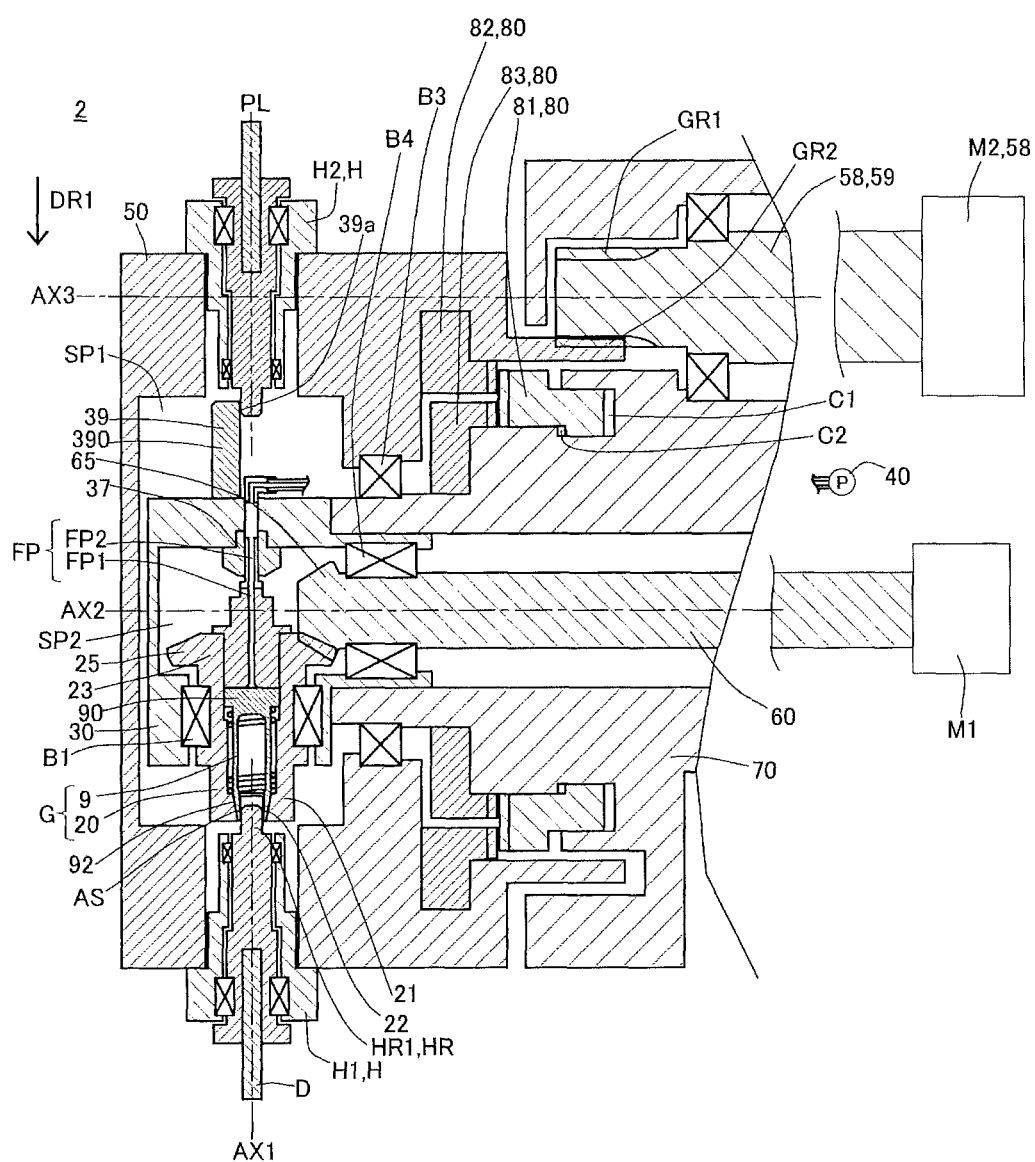
FIG. 11 is a schematic longitudinal sectional view of the example turret tool rest according to the second embodiment.

By referring to FIGS. 9 to 11, the turret tool rest 2 according to the second embodiment will be described. FIGS. 9 to 11 are schematic longitudinal sectional views of an example of the turret tool rest 2 according to the second embodiment. It is to be noted that FIGS. 9 and 11 illustrate a state in which the engagement member 9 is located at the first position, and FIG. 10 illustrates a state in which the engagement member 9 is located at the second position.

The following description of the second embodiment will mainly focus on those respects in which the second embodiment is different from the first embodiment, and common respects that have already been described in the first embodiment will not be described here to avoid redundancy. Therefore, it will be readily appreciated that a feature described in the first embodiment but not explicitly described in the second embodiment applies in the second embodiment as well.

The turret tool rest 2 includes a turret 50, the shaft 20, and the engagement member 9. An assembly of the shaft 20 and the engagement member 9 constitutes the above-described rotational force transmission mechanism G. As the rotational force transmission mechanism G according to the second embodiment, the rotational force transmission mechanism G according to the first embodiment may be employed, or some other rotational force transmission mechanism may be employed.

The turret 50 is a member on which a plurality of tool holders H including a tool holder H1 and a second tool holder H2 are mountable. The turret 50 is swingable about second axis AX2. By swinging about the second axis AX2, the turret 50 indexes one tool holder (for example, the tool holder H1) of the plurality of mounted tool holders H at a position at which the one tool holder is rotatable about the first axis AX1 in the turret tool rest 2 (in other words, a position corresponding to the receiving portion 22). In the example illustrated in FIG. 9, the turret 50 has an internal space SP1. It is to be noted that in the example illustrated in FIG. 9, the second axis AX2 is substantially perpendicular to the first axis AX1.

The shaft 20 is contained in the turret 50 rotatably about the first axis AX1. The shaft 20 includes the receiving portion 22. The receiving portion 22 receives at least a part of a rotatable portion HR1 of the tool holder H1, which is disposed on the first axis AX1 (more specifically, the receiving portion 22 receives a base end portion of the rotatable portion HR1). The shaft 20 drives the rotatable portion HR1 of the tool holder H1, which is among the plurality of tool holders H and which is now indexed on the first axis AX1.

The turret tool rest 2 may include a second shaft 60. In this case, the shaft 20 and the second shaft 60 are connected to each other in such a manner that motive power can be transmitted between the shaft 20 and the second shaft 60. In the example illustrated in FIG. 9, the shaft 20 includes a first bevel gear 25, and the second shaft 60 includes a second bevel gear 65, which is meshed with the first bevel gear 25.

The engagement member 9 is a member that is movable along the first axis AX1 between the first position and the second position. The engagement member 9 is rotatable about the first axis AX1 by rotation of the shaft 20. In the example illustrated in FIG. 9, the engagement member 9 has a longitudinal center axis that is substantially parallel to the first direction DR1.

In the second embodiment, at least one of the shaft 20 and the engagement member 9 includes the inclined surface AS. The inclined surface AS moves the engagement portion 92 of the engagement member 9 in a direction toward the first axis AX1 when the engagement member 9 moves from the first position (see FIG. 9) to the second position (see FIG. 10).

The shaft 20, the engagement member 9, and the inclined surface AS are already described in the first embodiment, and the components of the shaft 20, the engagement member 9, and the inclined surface AS will not be described here to avoid redundancy.

In the example illustrated in FIG. 9, the second shaft 60 is driven into rotation by a driver such as a motor M1. Upon rotation of the second shaft 60, the shaft 20 rotates about the first axis AX1, since the shaft 20 is connected to the second shaft 60 in a motive power transmittable manner.

When the shaft 20 rotates about the first axis AX1 with the engagement member 9 located at the first position (see FIG. 9), the rotation of the shaft 20 is transmitted directly to the rotatable portion HR1 by the receiving portion 22. When the shaft 20 rotates about the first axis AX1 with the engagement member 9 located at the second position (see FIG. 10), the rotation of the shaft 20 is transmitted to the rotatable portion HR1 via the engagement member 9. Upon rotation of the rotatable portion HR1 of the tool holder H1, the rotatable tool D, which is connected to the rotatable portion HR1, rotates about the center axis of the rotatable tool D.

The second embodiment provides advantageous effects similar to the advantageous effects of the first embodiment. More specifically, in the second embodiment, the turret tool rest 2 includes the engagement member 9, and the engagement member 9 is changeable in position between the first position and the second position. In this case, the level of accuracy at which the rotational force of the shaft 20 is transmitted is switchable at least between two levels, namely, a fair level of accuracy and a higher level of accuracy.

Also in the second embodiment, it is not necessary to use special tool holders as the tool holders mounted on the turret 50. In other words, tool holders connectable to conventional turrets can be mounted on the turret 50 according to the second embodiment. It is of course possible to design a special tool holder for the turret 50 according to the second embodiment and mount the special tool holder on the turret 50.

By referring to FIG. 11, an optional configuration employable in the second embodiment will be described.

Driver 58

The turret tool rest 2 may include a driver 58. The driver 58 makes the turret 50 swing about the second axis AX2. In the example illustrated in FIG. 11, the driver 58 includes a motor M2 and a third shaft 59, which is driven by the motor M2.

The third shaft 59 and the turret 50 are connected to each other in such a manner that motive power can be transmitted between the third shaft 59 and the turret 50. In the example illustrated in FIG. 11, the third shaft 59 includes a first gear GR1 on the outer circumferential surface of the third shaft 59, and the turret 50 includes a second gear GR2, which is meshed with the first gear GR1.

In the example illustrated in FIG. 11, the motor M1 rotates the shaft 20 about the first axis AX1 to perform positioning of the receiving portion 22 so that the receiving portion 22 (more specifically, the first groove GV1 illustrated in FIG. 7) opens in the direction in which the turret 50 swings about the second axis AX2. When the third shaft 59 is driven into rotation by a driver such as the motor M2 with the receiving portion 22 of the shaft 20 positioned, the third shaft 59 rotates about third axis AX3. Upon rotation of the third shaft 59 about the third axis AX3, the turret 50 swings about the second axis AX2, since the turret 50 is connected to the third shaft 59 in a motive power transmittable manner. It is to be noted that in the example illustrated in FIG. 11, the second axis AX2 is substantially parallel to the third axis AX3. It is also to be noted that the second axis AX2 is identical to the center axis of the second shaft 60.

Turret Base 70

In the example illustrated in FIG. 11, the turret tool rest 2 includes a turret base 70. The turret base 70 rotationally movably supports the turret 50 (in other words, first housing member) via a bearing member B3.

Housing 30

In the example illustrated in FIG. 11, the turret tool rest 2 includes the housing 30, which supports the shaft 20. The housing 30 rotationally movably supports the shaft 20 via the bearing member B1.

In the example illustrated in FIG. 11, the housing 30 is disposed in the turret 50. Also, the housing 30 is fixed to the turret base 70.

In the example illustrated in FIG. 11, the housing 30 has an internal space SP2. In the internal space SP2, elements such as the first bevel gear 25, the second bevel gear 65, and a base end portion 23 of the shaft 20 are disposed.

In the example illustrated in FIG. 11, the housing 30 rotationally movably supports the second shaft 60 via a bearing member B4. Alternatively or additionally, the turret base 70 may rotationally movably support the second shaft 60 via the bearing member B4.

In the example illustrated in FIG. 11, a revolute joint 37 is mounted on the housing 30. The revolute joint 37 is disposed on the first axis AX1. In the example illustrated in FIG. 11, the revolute joint 37 and the shaft 20 are connected to each other rotatably relative to each other.

In the example illustrated in FIG. 11, a first passage FP1 is formed in the shaft 20, and a second passage FP2 is formed in the revolute joint 37. The second passage FP2 is connected to the first passage FP1. The first passage FP1 and the second passage FP2 serve as the fluid supply path FP, through which fluid is supplied to the internal space of the shaft 20 (more specifically, the space in which the engagement member 9 is contained). It is to be noted that in the example illustrated in FIG. 11, the portion of the shaft 20 supporting the engagement member 9 and the portion of the shaft 20 in which the first passage FP1 is formed are mutually separate members. Alternatively, the portion of the shaft 20 supporting the engagement member 9 and the portion of the shaft 20 in which the first passage FP1 is formed may be an integrally formed single member.

Coupling Member 80

In the example illustrated in FIG. 11, the turret 50 includes a coupling member 80. The coupling member 80 switches the turret 50 between a first state in which the turret 50 is swingable relative to the turret base 70 and a second state in which the turret 50 is un-swingable relative to the turret base 70. In the example illustrated in FIG. 11, the coupling member 80 includes: a first member 81, which is movable in a direction parallel to the second axis AX2; a second member 82, which is fixed to the turret 50; and a third member 83, which is fixed to the turret base 70. A state in which the first member 81 is engaged with the second member 82 and the third member 83 corresponds to the above-described second state, and a state in which the first member 81 is apart from the second member 82 and the third member 83 corresponds to the above-described first state. It is to be noted that the switching from the first state to the second state is performed by moving the first member 81 toward the second member 82 and the third member 83 (for example, by supplying fluid to a first cylinder chamber C1). Also, the switching from the second state to the first state is performed by moving the first member 81 in a direction away from the second member 82 and the third member 83 (for example, by supplying fluid to a second cylinder chamber C2).

Guide 39

The turret tool rest 2 may include a guide 39. The guide 39 regulates the posture of the rotatable portion HR1 when the turret 50 swings about the second axis AX2. In the example illustrated in FIG. 11, the guide 39 is mounted on the housing 30.

In the example illustrated in FIG. 11, when the turret 50 swings about the second axis AX2, the rotatable portions (HR1, HR2) of the plurality of tool holders (H1, H2) are prevented by the guide 39 from rotating about the rotation axes of the respective rotatable portions. Also, when the rotatable portion of the tool holder used in machining is located at a position apart from the first axis AX1, the guide 39 guides the rotatable portion to a position on the first axis AX1 (in other words, a position corresponding to the receiving portion 22).

An example of the guide 39 is a ring-shaped member 390, which has a cutout portion. In the cutout portion of the ring-shaped member 390, the leading end portion 21 of the shaft 20 is disposed. When the turret 50 swings 360° about the second axis AX2, the rotatable portion HR1 of the tool holder is guided by the leading end portion 21 of the shaft 20 (more specifically, the first groove GV1 illustrated in FIG. 7) and by a guide surface 39a of the guide 39. From the viewpoint of smooth guidance of the rotatable portion HR1, the guide surface 39a of the guide 39 is preferably flush with a first side surface of the first groove GV1 (that is, the first contact surface CS1 illustrated in FIG. 7) or a second side surface of the first groove GV1 (that is, the second contact surface CS2 illustrated in FIG. 7).

In the example illustrated in FIG. 11, the guide surface 39a is disposed only on one side of an imaginary surface PL, which is formed by a 360° rotation of the first axis AX1 about the second axis AX2. Alternatively, the guide 39 may have: a first guide surface 39a, which is disposed on one side of the imaginary surface PL, which is formed by a 360° rotation of the first axis AX1 about the second axis AX2; and a second guide surface disposed on the other side of the imaginary surface PL. In this case, the rotatable portion HR1 is guided by the guide 39 while being held between the first guide surface 39a and second guide surface.

In the example illustrated in FIG. 11, when the engagement member 9 is located at the first position, there is a gap between: the rotatable portion HR of the tool holder H; and the receiving portion 22 of the shaft 20 and the engagement portion 92 of the engagement member 9. This ensures that after performing machining at a fair level of accuracy, it is only necessary to perform positioning of the shaft 20 by rotating the shaft 20 about the first axis AX1; afterward, the turret 50 is swung and another tool holder H mounted on the turret 50 is indexed at a position at which the another tool holder H is rotatable about the first axis AX1. Thus, a fair level of machining may be performed with the engagement member 9 located at the first position, and only a part requiring a particularly high level of accuracy may be machined with the engagement member 9 moved to the second position. In this manner, a high level of machining accuracy is realized. This configuration also shortens the operation time of the turret tool rest 2.

FIGS. 9 to 11 illustrate a state in which the turret 50 and the turret base 70 constitute an assembly. Alternatively, the turret 50 and the turret base 70 may be provided separately from each other. For example, the turret 50 may be sold independently of the turret base 70. Also in the examples illustrated in FIGS. 9 to 11, all the tool holders H are tool holders for supporting rotatable tools. Alternatively, at least one of the plurality of tool holders H may be a tool holder for supporting a non-rotatable tool.

Third Embodiment

Figure 12:
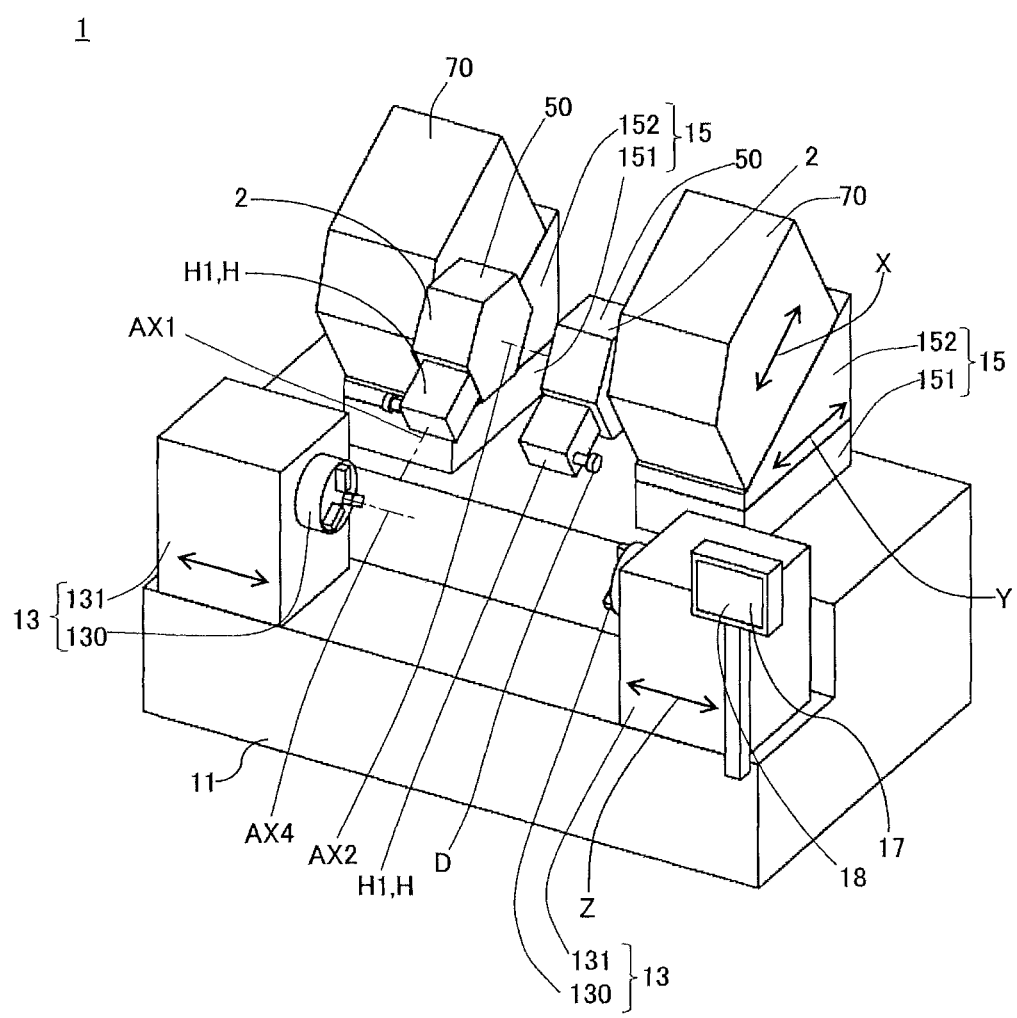
FIG. 12 is a schematic perspective view of an example lathe according to a third embodiment.

By referring to FIGS. 11 and 12, the lathe 1 according to the third embodiment will be described. FIG. 12 is a schematic perspective view of an example of the lathe 1 according to the third embodiment.

The following description of the third embodiment will mainly focus on those respects in which the third embodiment is different from the first and second embodiments, and common respects that have already been described in the first or second embodiment will not be described here to avoid redundancy. Therefore, it will be readily appreciated that a feature described in the first or second embodiment but not explicitly described in the third embodiment applies in the third embodiment as well.

The lathe 1 includes a base 11, spindles 13, turret tool rests 2, and a carriage 15. The lathe 1 may include a controller 17.

The base 11 is a member that directly or indirectly supports each turret tool rest 2 and/or each spindle 13. The base 11 is disposed on, for example, a floor surface in a building.

Each spindle 13 supports a workpiece. In the example illustrated in FIG. 12, each spindle 13 includes: a workpiece holder 130, which holds the workpiece; and a headstock 131, which rotatably supports the workpiece holder 130. The rotation axis, AX4, of the workpiece holder 130 is substantially parallel to, for example, the second axis AX2.

In the example illustrated in FIG. 12, each spindle 13 is slidable in Z axis direction (that is, a direction parallel to the rotation axis AX4) relative to the base 11. Alternatively, the spindle 13 may be unmovable relative to the base 11. Also in the example illustrated in FIG. 12, the lathe 1 includes two spindles 13. Alternatively, the lathe 1 may include a single spindle 13 or may include three or more spindles 13.

In the example illustrated in FIG. 12, the lathe 1 includes two turret tool rests 2. Alternatively, the lathe 1 may include a single turret tool rest 2 or may include three or more turret tool rests 2. Each turret tool rest 2 according to the third embodiment may be the turret tool rest 2 described in the second embodiment or may be some other turret tool rest.

Each turret tool rest 2 includes: the turret base 70; the turret 50, on which a plurality of tool holders H including the tool holder H1 are mountable; a turret driver (an example of "a turret actuator", for example, see the driver 58 illustrated in FIG. 11); a shaft that drives the rotatable portion of the tool holder H1 (for example, see the shaft 20 illustrated in FIG. 11); shaft drivers (an example of "a shaft motor", for example, the motor Ml and the second shaft 60 illustrated in FIG. 11); an engagement member (for example, the engagement member 9 illustrated in FIG. 11); and an engagement member driver (for example, the engagement member driver 40 illustrated in FIG. 11). The turret tool rest 2 may include a guide (for example, the guide 39 illustrated in FIG. 11). It is to be noted that an example of the engagement member driver 40 is an actuator of any convenient form. The engagement member driver 40 may include a pump P, which may be of any convenient form through which fluid is supplied to the inside of the shaft 20 (see FIG. 11).

The components of the turret tool rest 2 are already described in the second embodiment and will not be described here to avoid redundancy.

The carriage 15 is a device that moves the turret tool rest 2 relative to the base 11. In the example illustrated in FIG. 12, the carriage 15 includes: a first unit 151, which is fixed to the base 11; and a second unit 152, which is movable in Y axis direction relative to the first unit 151. It is to be noted that in the example illustrated in FIG. 12, the Y axis direction is a direction perpendicular to the Z axis direction and parallel to a horizontal surface. The second unit 152 supports the turret base 70 movably in the X axis direction. In the example illustrated in FIG. 12, the X axis direction is a direction perpendicular to the Z axis and non-parallel to the horizontal surface. The X axis direction may be a direction substantially parallel to the extending direction of the first axis AX1.

In the example illustrated in FIG. 12, the angle defined between the X axis direction and the Y axis direction is larger than 0 degrees and smaller than 90 degrees. Alternatively, the angle defined between the X axis direction and the Y axis direction may be 90 degrees.

The controller 17 is a device that controls the carriage 15, the turret driver (for example, the driver 58), the shaft driver (for example, the motor M2), and the engagement member driver (for example, the pump P or a valve that opens and closes the fluid supply path FP).

An example of the controller 17 is a computer that includes a CPU and a storage device. By executing a program stored in the storage device, the controller 17 serves as the controller 17. The controller 17 may include an input device 18, on which to input control parameters, a machining start command, and other information.

The controller 17 is connected, via a wire or wirelessly, to the carriage 15, the turret driver, the shaft driver, and the engagement member driver in a signal-transmittable manner.

Based on a first signal received from the controller 17, the carriage 15 moves the turret base 70 relative to the base 11.

Based on a second signal received from the controller 17, the turret driver (for example, the driver 58) swings the turret 50 about the second axis AX2.

Based on a third signal received from the controller 17, the shaft driver (for example, the motor M2) rotates the shaft 20 about the first axis AX1. The rotation of the shaft 20 causes the rotatable portion of the tool holder H1 to rotate. The rotation of the rotatable portion of the tool holder H1 causes the rotatable tool D to rotate. It is to be noted that the rotation axis of the rotatable portion of the tool holder H1 and the rotation axis of the rotatable tool D may be in line with each other. Alternatively, the rotation axis of the rotatable portion of the tool holder H1 and the rotation axis of the rotatable tool D may not necessarily be in line with each other (in other words, the rotatable portion of the tool holder H1 and the rotatable tool D may be connected to via any convenient transmission mechanism).

Based on a fourth signal received from the controller 17, the engagement member driver (for example, the pump P or a valve that opens and closes the fluid supply path FP) moves the engagement member 9 along the first axis AX1. By the movement of the engagement member 9, the level of accuracy at which rotational force is transmitted from the shaft 20 to the rotatable portion of the tool holder H1 is switched.

The third embodiment provides advantageous effects similar to the advantageous effects of the first embodiment or the second embodiment.

Examples of Application of Rotational Force Transmission Mechanism, Turret Tool Rest 2, and Lathe 1

The rotational force transmission mechanism G according to the first embodiment, the turret tool rest 2 according to the second embodiment, or the lathe 1 according to the third embodiment may be used to perform a screw hole forming method for forming a small-diameter screw hole. The screw hole forming method includes (A) a step of moving the engagement member 9 from the first position to the second position, (B) a step of rotating the shaft 20 about the first axis AX1, (C) a step of transmitting the rotation of the shaft 20 to the rotatable portion HR1 of the tool holder H1 via the engagement member 9, (D) a step of rotating the rotatable portion HR1 so as to rotate the rotatable tool D, and (E) a step of linearly moving a workpiece relative to the rotatable tool D synchronously with the rotation of the rotatable tool D so as to form a screw hole on the workpiece.

Figure 13:
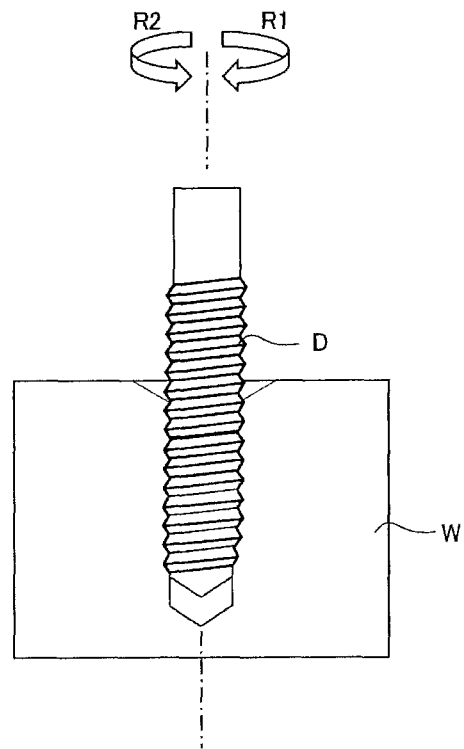
FIG. 13 illustrates a screw hole forming method.

In the example illustrated in FIG. 13, formation of a screw hole includes: rotating the rotatable tool D in first rotation direction R1 to form a screw hole on a workpiece W; and rotating the rotatable tool D in second rotation direction R2 (which is a direction opposite to the first rotation direction R1) to pull the rotatable tool D out of the workpiece W.

When there is a large gap between the receiving portion 22 of the shaft 20 and the rotatable portion HR1 of the tool holder H1, there occurs a large backlash involved in the switching of the rotation direction of the rotatable tool D from the first rotation direction R1 to the second rotation direction R2. In this case, when the rotatable tool D is pulled out of the workpiece, it is possible that the rotation and linear movement of the rotatable tool D cannot be synchronized with each other. This may cause a mismatch to occur between the track of the rotatable tool D and the spiral groove of the screw hole foinied by the rotatable tool D. As a result, the screw hole may be cut wide, or the rotatable tool D may be damaged. When, in particular, the rotatable tool D used has a small diameter, there is a higher possibility of the rotatable tool D being damaged. In light of this possibility, the above-described screw hole forming method includes moving the engagement member 9 from the first position to the second position. This ensures that the engagement member 9 fills the gap between the receiving portion 22 of the shaft 20 and the rotatable portion HR1 of the tool holder 141. Filling the gap reduces the possibility of damage to the rotatable tool D even when the rotatable tool D has a small diameter.

The rotational force transmission mechanism G according to the first embodiment, the turret tool rest 2 according to the second embodiment, or the lathe 1 according to the third embodiment may be used to perform an internal gear forming method for forming gear parts on the inner circumferential surface of a workpiece. The internal gear forming method includes (A) a step of moving the engagement member 9 from the first position to the second position, (B) a step of rotating the shaft 20 about the first axis AX1, (C) a step of transmitting the rotation of the shaft 20 to the rotatable portion HR1 of the tool holder H1 via the engagement member 9, (D) a step of rotating the rotatable portion HR1 so as to rotate the rotatable tool D, (E) a step of rotating the workpiece holder 130 of the spindle 13 so as to rotate the workpiece, and (F) a step of forming gear parts on the inner circumferential surface of the workpiece using the rotation of the rotatable tool D and the workpiece and linear movement of the workpiece relative to the rotatable tool D.

Figure 14:
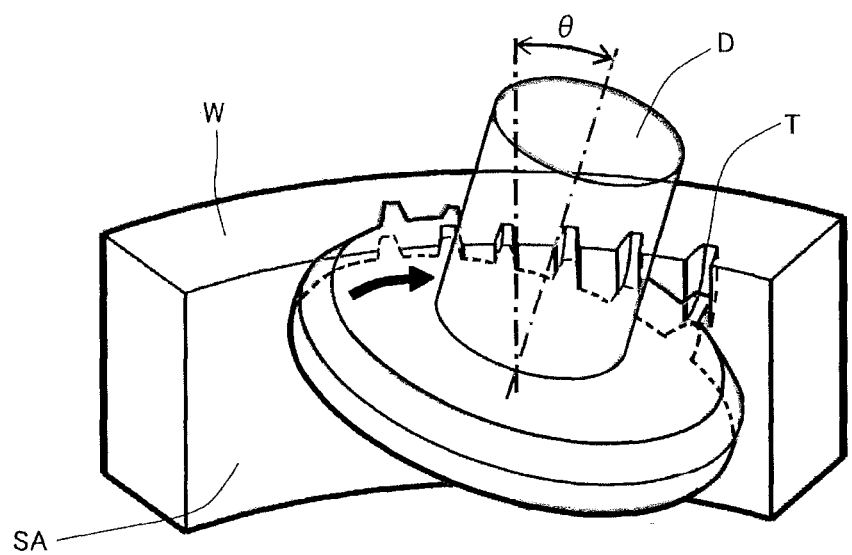
FIG. 14 illustrates gear skiving.

As illustrated in FIG. 14, internal gears T may be formed by gear skiving. As illustrated in FIG. 14, the gear skiving includes, with the blade of the rotatable tool D inclined by a predetermined angle θ relative to the workpiece W that is rotating, cutting the inner circumferential surface, SA, of the workpiece W using the blade of the rotatable tool D. By cutting the inner circumferential surface SA of the workpiece W, the internal gears T are formed on the inner circumferential surface SA of the workpiece W. It is to be noted that in the gear skiving, it is necessary to rotate the rotatable tool D accurately.

In the gear skiving, the rotatable tool D receives loads from different directions from the workpiece W during the gear skiving. Under the circumstances, when there is a large gap between the rotatable portion HR1 of the tool holder H1 and the receiving portion 22 of the shaft 20, the gap may cause vibrations to occur, which may prevent the rotatable tool D from rotating accurately. As a result, the rotatable tool D is prevented from forming the internal gears T on workpiece W appropriately. In light of this situation, the above-described internal gear forming method includes moving the engagement member 9 from the first position to the second position. This ensures that the engagement member 9 fills the gap between the receiving portion 22 of the shaft 20 and the rotatable portion HR1 of the tool holder H1. Filling the gap ensures that the internal gears T are formed on the inner circumferential surface SA of the workpiece W appropriately using the rotatable tool D, which is dedicated to gear skiving.

The rotational force transmission mechanism G according to the first embodiment, the turret tool rest 2 according to the second embodiment, or the lathe 1 according to the third embodiment may be used to perform a workpiece rough cutting method. The workpiece rough cutting method includes (A) a step of rotating the shaft 20 about the first axis AX1 with the engagement member 9 kept at the first position, (B) a step of transmitting the rotation of the shaft 20 directly to the rotatable portion HR1 of the tool holder H1, (C) a step of rotating the rotatable portion HR1 so as to rotate the rotatable tool D, and (D) a step of cutting a workpiece using the rotation of the rotatable tool D.

When a workpiece is subjected to rough cutting, the rotatable tool D receives a large amount of load. Under the circumstances, it is necessary to transmit a relatively large amount of torque from the shaft 20 to the rotatable portion of the tool holder H. In the above-described workpiece rough cutting method, the engagement member 9 is kept at the first position. This enables the shaft 20 to directly transmit rotational force to the rotatable portion HR1 of the tool holder H1. As a result, the shaft 20 is able to transmit a relatively large amount of torque to the rotatable portion of the tool holder H.

In the present disclosure, the term "comprise" and its variations are intended to mean open-ended terms, not excluding any other elements and/or components that are not recited herein. The same applies to the terms "include", "have", and their variations.

In the present disclosure, a component suffixed with a term such as "member", "portion", "part", "element", "body", and "structure" is intended to mean that there is a single such component or a plurality of such components.

In the present disclosure, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

In the present disclosure, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

In the present disclosure, the phrase "at least one of A and B" is intended to be interpreted as "only A", "only B", or "both A and B".

Obviously, numerous modifications and variations of the present invention are possible in light of the above teachings. It is therefore to be understood that within the scope of the appended claims, the present disclosure may be practiced otherwise than as specifically described herein.

What is claimed is:

1. A rotational force transmission mechanism comprising:
    a shaft rotatable about a first axis, the shaft including a leading end portion having a second groove and a first groove which is configured to receive a rotatable portion of a tool holder;
    an engagement pin provided in the shaft to move along the first axis between a first position and a second position and to rotate about the first axis together with the shaft, the engagement pin including an engagement portion which is received in the second groove; and
    at least one of the shaft and the engagement pin having an inclined surface that moves the engagement portion in a direction toward the first axis when the engagement pin moves from the first position to the second position so that, in the first position, the engagement portion does not engage with the rotatable portion of the tool holder and rotational force is transmitted from the shaft to the rotatable portion without via the engagement pin and so that, in the second position, the engagement portion engages with the rotatable portion to transmit the rotational force via the engagement portion.

2. The rotational force transmission mechanism according to claim 1,
    wherein the first groove has a contact surface configured to contact with the rotatable portion,
    wherein when the engagement pin is located at the first position, the engagement portion is located at a withdrawal position at which the engagement portion is away from the contact surface in a direction away from the first axis, and
    wherein when the engagement pin is located at the second position, the engagement portion is located at a protrusion position at which the engagement portion protrudes from the contact surface in the direction toward the first axis.

3. The rotational force transmission mechanism according to claim 2,
    wherein a distance between the first axis and a point at which the contact surface applies a rotational force to the rotatable portion when the engagement pin is located at the first position is defined as a distance L1,
    wherein a distance between the first axis and a point at which the engagement portion applies a rotational force to the rotatable portion when the engagement pin is located at the second position is defined as a distance L2, and
    wherein the distance L1 is larger than the distance L2.

4. The rotational force transmission mechanism according to claim 3, further comprising:
    an engagement pin actuator configured to move the engagement pin along the first axis.

5. The rotational force transmission mechanism according to claim 2,
    wherein the shaft contains the engagement pin movably along the first axis, and
    wherein when the engagement pin is located at the second position, an outer surface of the engagement portion is in contact with an inner surface of the shaft, and an inner surface of the engagement portion is in contact with the rotatable portion of the tool holder.

6. The rotational force transmission mechanism according to claim 2, further comprising:
    an engagement pin actuator configured to move the engagement pin along the first axis.

7. The rotational force transmission mechanism according to claim 1,
    wherein the shaft contains the engagement pin in the shaft movably along the first axis, and
    wherein, when the engagement pin is located at the second position, an outer surface of the engagement portion is in contact with an inner surface of the shaft, and an inner surface of the engagement portion is in contact with the rotatable portion of the tool holder.

8. The rotational force transmission mechanism according to claim 7, further comprising:

an engagement pin actuator configured to move the engagement pin along the first axis.

9. The rotational force transmission mechanism according to claim 1, further comprising:
an engagement pin actuator configured to move the engagement pin along the first axis.

10. The rotational force transmission mechanism according to claim 9,
wherein the engagement pin actuator comprises
a piston which includes a part of the engagement pin or which is a separate structure separate from the engagement pin, and
a cylinder configured to guide the piston.

11. The rotational force transmission mechanism according to claim 1, further comprising:
a spring configured to bias the engagement pin in a direction from the second position toward the first position.

12. The rotational force transmission mechanism according to claim 1, further comprising:
a stopper configured to prevent the engagement pin from moving beyond a preset position in a direction from a base end portion of the shaft toward a leading end portion of the shaft.

13. The rotational force transmission mechanism according to claim 1, wherein the engagement pin comprises a first holding piece and a second holding piece that are configured to hold the rotatable portion when the engagement pin is located at the second position.

14. The rotational force transmission mechanism according to claim 1, wherein the engagement pin comprises a leg supporting the engagement portion, the leg being elastically deformable in the direction toward the first axis.

15. The rotational force transmission mechanism according to claim 1, wherein the first groove is configured to receive at least a part of the rotatable portion of a tool holder.

16. A turret tool rest comprising:
a turret which is swingable about a second axis and on which a plurality of tool holders are mountable;
a shaft contained in the turret rotatably about a first axis, the shaft including a leading end portion having a second groove and a first groove which is configured to receive a rotatable portion of a tool holder that is among the plurality of tool holders and that is disposed on the first axis;
an engagement pin provided in the shaft to move along the first axis between a first position and a second position and to rotate about the first axis together with the shaft, the engagement pin including an engagement portion which is received in the second groove; and
at least one of the shaft and the engagement pin having an inclined surface that moves the engagement portion in a direction toward the first axis when the engagement pin moves from the first position to the second position so that, in the first position, the engagement portion does not engage with the rotatable portion of the tool holder and rotational force is transmitted from the shaft to the rotatable portion without via the engagement pin and so that, in the second position, the engagement portion engages with the rotatable portion to transmit the rotational force via the engagement portion.

17. The turret tool rest according to claim 16, further comprising:
a guide configured to regulate a posture of the rotatable portion when the turret swings about the second axis.

18. A lathe comprising:
a base;
a spindle configured to support a workpiece;
a turret tool rest comprising:
a turret base;
a turret which is swingable about a second axis and on which a plurality of tool holders are mountable;
a turret actuator configured to swing the turret about the second axis;
a shaft contained in the turret rotatably about a first axis, the shaft including a leading end portion having a second groove and a first groove which is configured to receive a rotatable portion of a tool holder that is among the plurality of tool holders and that is disposed on the first axis;
a shaft motor configured to rotate the shaft about the first axis;
an engagement pin provided in the shaft to move along the first axis between a first position and a second position and to rotate about the first axis together with the shaft, the engagement pin including an engagement portion which is received in the second groove;
at least one of the shaft and the engagement pin having an inclined surface that moves the engagement portion in a direction toward the first axis when the engagement pin moves from the first position to the second position so that, in the first position, the engagement portion does not engage with the rotatable portion of the tool holder and rotational force is transmitted from the shaft to the rotatable portion without via the engagement pin and so that, in the second position, the engagement portion engages with the rotatable portion to transmit the rotational force via the engagement portion; and
an engagement pin actuator configured to move the engagement pin along the first axis; and
a carriage configured to move the turret tool rest relative to the base.

19. The lathe according to claim 18, further comprising:
a guide configured to regulate a posture of the rotatable portion when the turret swings about the second axis; and
a controller configured to control the carriage, the turret actuator, the shaft motor, and the engagement pin actuator,
wherein the carriage is configured to move the turret base relative to the base based on a first signal received from the controller,
wherein the turret actuator is configured to swing the turret about the second axis based on a second signal received from the controller,
wherein the shaft motor is configured to rotate the shaft about the first axis based on a third signal received from the controller, and
wherein the engagement pin actuator is configured to move the engagement pin along the first axis based on a fourth signal received from the controller.

20. The rotational force transmission mechanism according to claim 3,
wherein the shaft contains the engagement pin movably along the first axis, and
wherein when the engagement pin is located at the second position, an outer surface of the engagement portion is in contact with an inner surface of the shaft, and an inner surface of the engagement portion is in contact with the rotatable portion of the tool holder.

* * * * *